Inventor
Forrest G. Purinton,
Parker Cook
By
Attorney

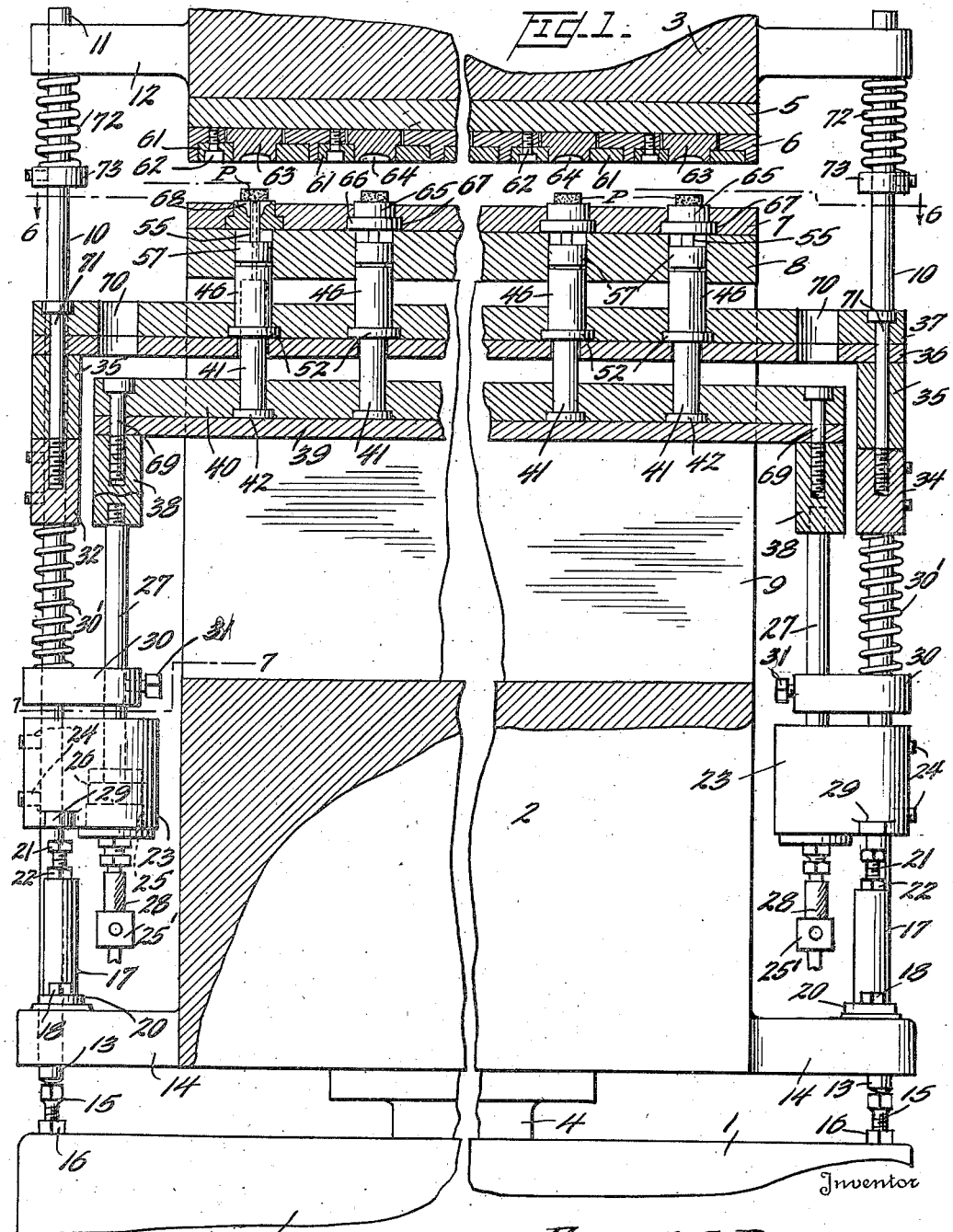

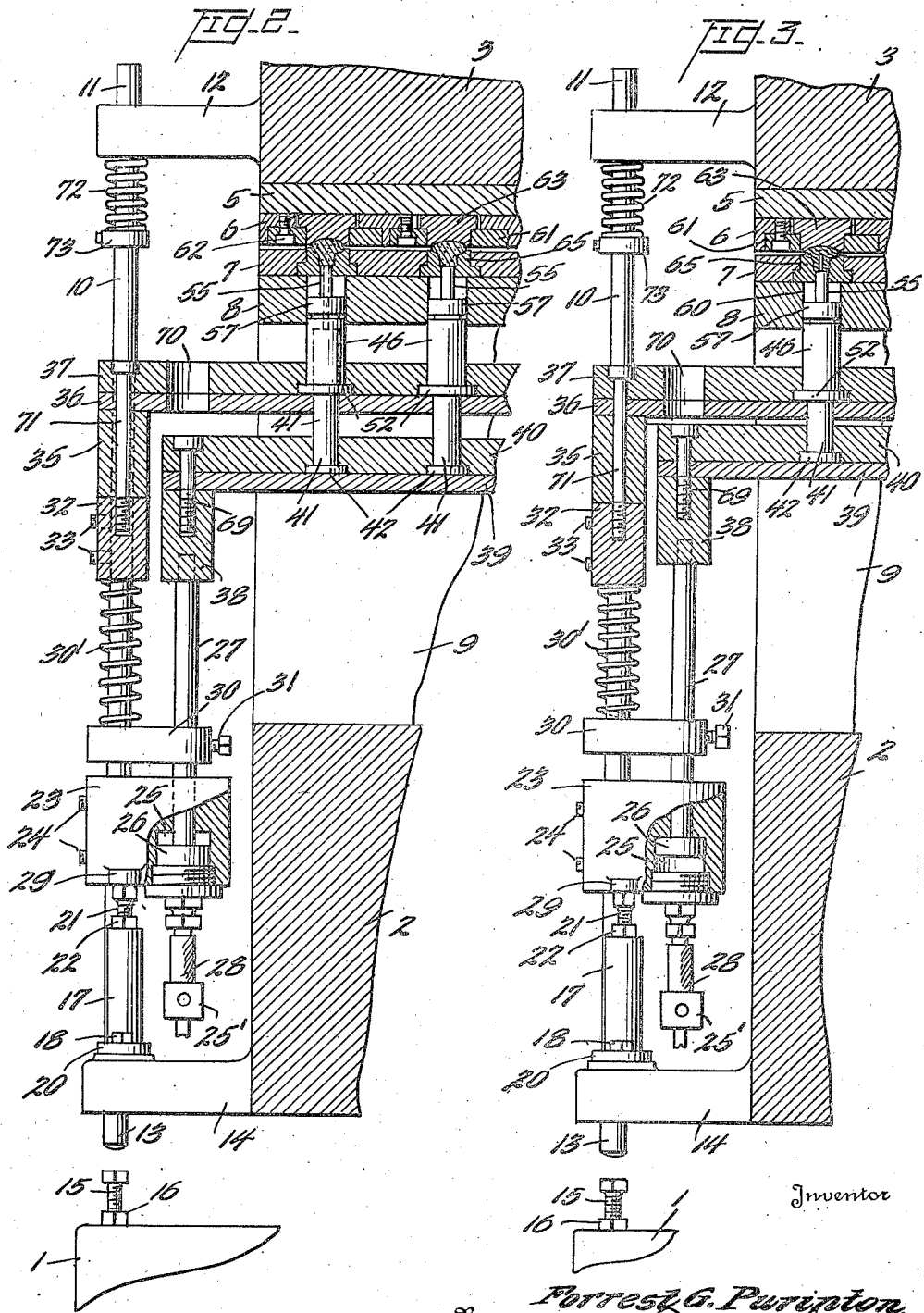

July 16, 1946.  F. G. PURINTON  2,403,948
METHOD OF AND APPARATUS FOR DEEP HOLE MOLDING
Filed June 30, 1944  5 Sheets-Sheet 4
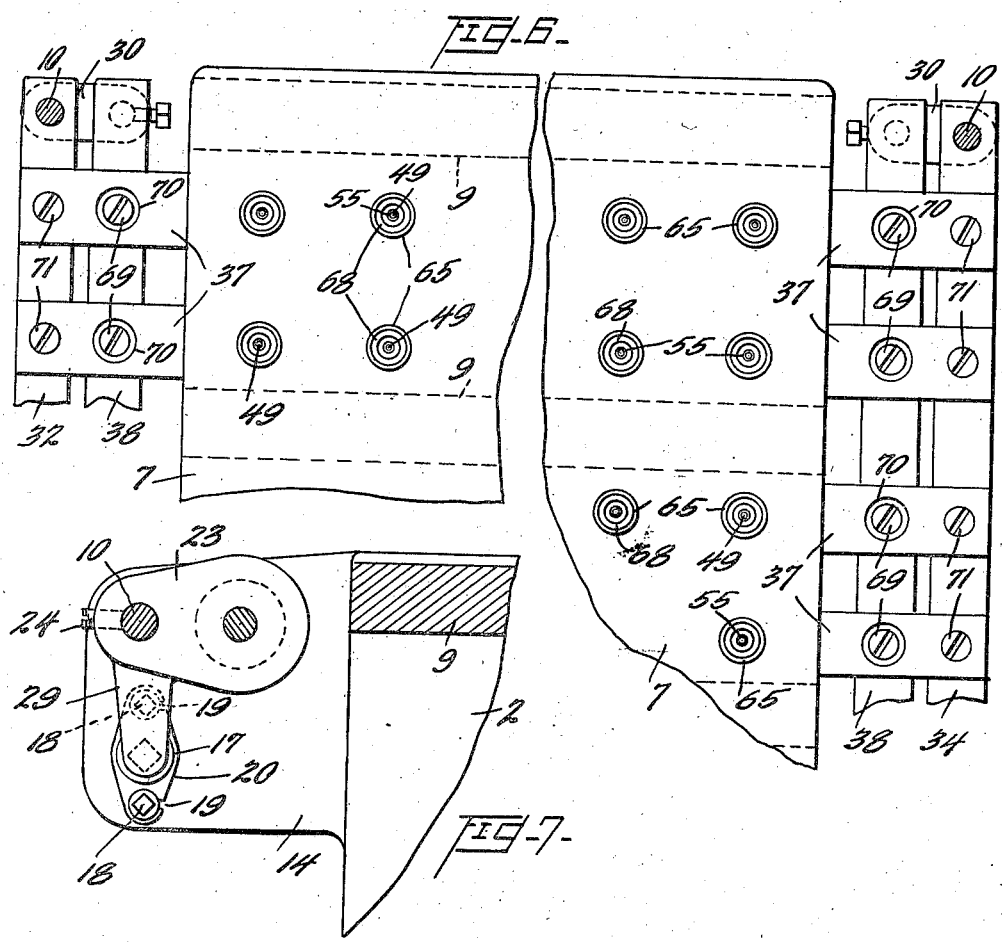
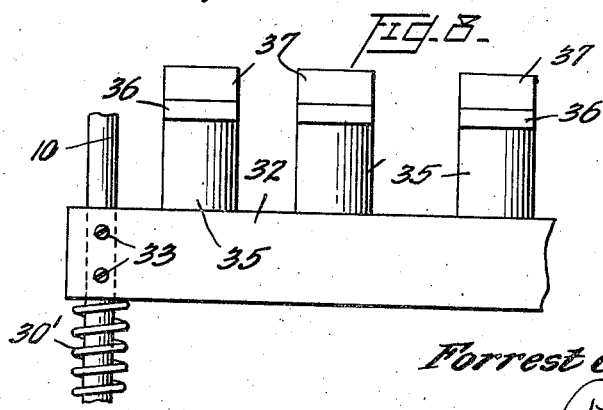
Inventor
Forrest G. Purinton,
By Parker Cook.
Attorney

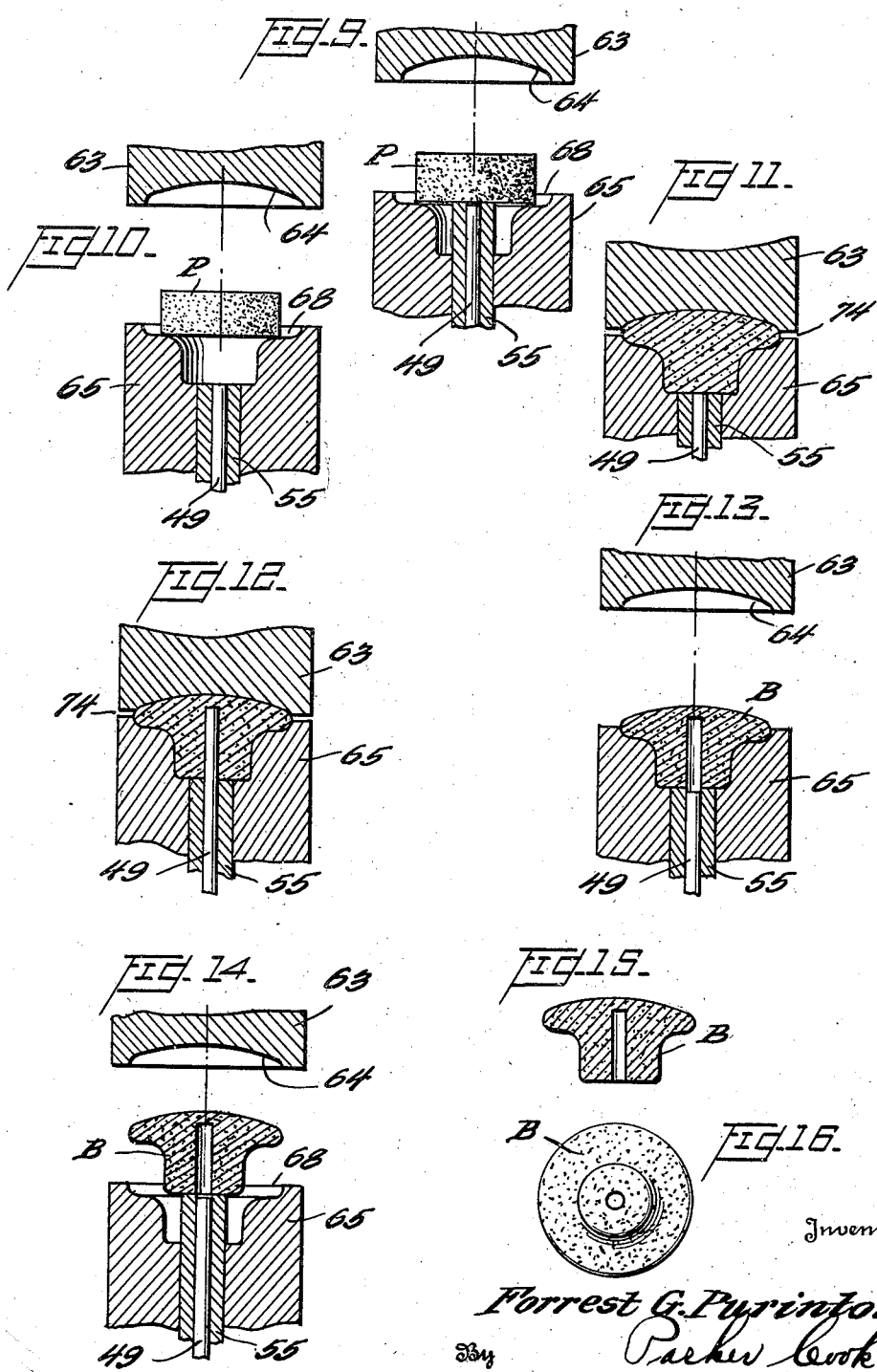

Patented July 16, 1946

2,403,948

UNITED STATES PATENT OFFICE 2,403,948

METHOD OF AND APPARATUS FOR DEEP HOLE MOLDING

Forrest G. Purinton, Waterbury, Conn., assignor to The Patent Button Company, Waterbury, Conn., a corporation of Connecticut Application June 30, 1944, Serial No. 542,962

11 Claims. (Cl. 18—17)

My invention relates to new and useful improvements in the method of and apparatus for deep hole molding.

One of the objects is to provide a new and useful method for the successful and practical molding of a deep hole in a plastic button or the like, in which hole there is to be driven the fluted shank of a tack fastener to thus hold the button to its carrying medium.

As is well known to those skilled in the art, numerous attempts have been made to mold a relatively deep hole of relatively small diameter in plastic buttons or the like, but these attempts have not met with much success as it has not been considered good practice to mold small holes, that is, one sixteenth of an inch or less in diameter, deeper than the diameter of the molding pin. In other words, where the hole is relatively small in diameter, one sixteenth of an inch or under, and the pin that molds the hole is supported at one end only, it is considered practical to use only a 1–1 ratio of depth to diameter in a compression mold.

An object of the present invention, therefore, is to provide a method and apparatus where relatively small holes, say from fifty-seven thousandths to sixty-three thousandths (.057 to .063) in diameter, may be molded to a depth of two hundred and eighty thousandths (.280) which is a ratio of depth to the diameter of four-and-one-half or five to one (4½ or 5 to 1) without in any way damaging the relatively thin molding pins.

As is also well known to those skilled in the art, the central hole or bore in the button that receives the tack fastener is relatively small in diameter, but in turn the hub is also of relatively small diameter, so the bore must extend to a depth of from four to five times the diameter of the bore, so that the fluted shank fastener may secure as much grip as possible on the walls about the bore, to thus hold the button in its attached position.

Still another object of the invention is to provide a method of molding plastic buttons and the like with relatively deep holes without any likelihood of damaging the molding pin, as the plastic, in pill form, is placed in the die and then first heated to its plastic state. After the plastic is in this state, the molding pin is projected into the plastic so that it may cure about the pin. This overcomes certain disadvantages, one of the most important being that if the molding pin projects into the die cavity when the dies are first closed and the plastic is heated, there is likely to be more plastic in one side of the cavity than the other, and under the compression of the molds the plastic starts to flow across the cavity and thus bends or damages the pin.

Still another object of the invention is to provide a method so that when the dies are closed the molding pin is in a retracted position and the cavities entirely filled with plastic under heat and pressure after which the pin is projected into the uncured material, and as the cavity is now entirely filled with plastic in its plastic state, there is no cross pressure on the molding pin to thus bend or break it. After the dies are opened a sleeve which surrounds the pin is projected to strip the button out of the cavity, thus assuring long life for the molding pins.

Still another object of the invention is to provide an apparatus for carrying out the method of molding as above outlined, where a press is fitted or furnished with molds having multiple die cavities so that from two to three hundred buttons may be molded in the one operation, all of which buttons will be provided with holes of desired depth, that is, a ratio of four or five to one in depth to the diameter of the pin.

Still another object of the invention is to provide an apparatus wherein the multiple die cavities may be readily filled with plastic pills and the dies closed, the molding pins being held in a retracted position, so that as the pills break up, the pins being in a retracted position, cannot possibly be damaged. Then after the cavity is completely filled and the plastic in its plastic state, the pins are simultaneously projected into the respective die cavities, the plastic allowed to cure and then ejectors brought into operation to strip the buttons from their die cavities. Then the buttons can be brushed off into a tray, and here again, without any fear of damaging the relatively thin molding pin.

Still another object of the invention is to provide an apparatus which may be built in or fitted to a standard form of molding press, say a one hundred and fifty ton press, so that the molding pins and ejector sleeves may be operated by header bars and other parts that will be described more fully as the description proceeds.

With these and numerous other objects in view, the invention consists in certain new and novel methods and combination of parts as will be hereinafter more fully described and pointed out in the claims.

Referring now to the drawings illustrating the method and showing a preferred embodiment of an apparatus for carrying out the method:

Fig. 1 is an end view of a molding press showing the knock-out bars, header bars, and various parts in section, the dies being in a fully open position and the platen at its lowermost position;

Fig. 2 is a fragmentary similar view, showing half the machine and showing the dies in the closed position and the molding pins in their retracted position;

Fig. 3 is a similar view, but showing the several parts as having been operated and the molding pin now projecting into the lower die cavity;

Fig. 6 is a fragmentary top plan view on line 6—6 of Fig. 1, showing the lower die plate supported in the press with the plastic pills omitted;

Fig. 7 is a fragmentary sectional view taken on line 7—7 of Fig. 1;

Fig. 8 is a fragmentary end view of the header bar, collars, ejector sleeve bar, etc.;

Fig. 9 is a fragmentary sectional view showing the dies (an upper and lower) open and a plastic pill resting in the lower die cavity, the ejector pin and the molding pin being projected, that is in the position they occupy on the fully open position of the dies;

Fig. 10 is a similar view but showing the ejector sleeve and molding pin as having been withdrawn on a starting movement of the closing of the dies;

Fig. 11 shows the pill now in the shape of a button, the dies having closed, the ejector sleeve and molding pin still being in a retracted position;

Fig. 12 is a similar view but showing the molding pin now as projected into the plastic button;

Fig. 13 shows the dies as having partially opened and the molding pin as having been retracted;

Fig. 14 shows the dies fully open, the cured button, and the ejector sleeve as stripping the button from the die cavity;

Fig. 15 is a sectional view of the completed button; and

Fig. 16 is a bottom plan view of the completed button.

Figure 4:
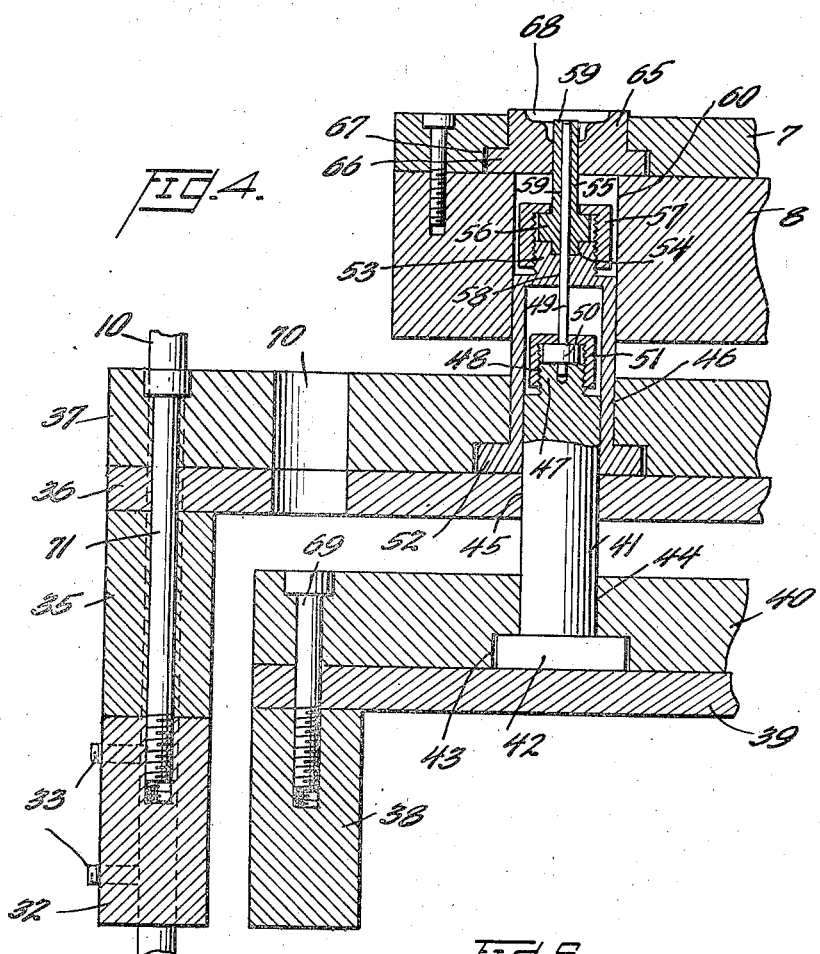
Fig. 4 is a fragmentary sectional view on an enlarged scale showing the lower die cavity, molding pin, ejector sleeve and parts for operating the same.

At the beginning it is to be noted that I have only shown that much of the press as is thought necessary to explain the invention.

However, it will be understood that the parts that are illustrated may be attached or built in a conventional press as the press itself and the manner of supplying the heat and the pressure for the dies do not have to be in any way changed.

It is also to be noticed that the header bars and knock-out mechanisms are so designed that they can easily be fitted in place and can just as easily be removed so that if it is desired to mold buttons or the likewithout the deep hole molding, the double knock-out mechanism disclosed may be easily removed or simply disconnected if desired.

Referring now for the moment to Fig. 1, there is shown a fragmentary portion of the base 1 of the press. There is also shown the lower platen 2 and the upper platen 3, but the four corner rods on which the lower platen is guided are not shown.

There also may be seen the head of the hydraulically operated piston 4 for elevating the lower platen 2. Also there may be seen the heating plate 5, and the plate 6 which carries the upper dies, which will be shortly mentioned.

Also, in Fig. 1 may be seen the plate 7 which carries the lower dies with its heating plate 8, while supporting this plate may be seen relatively thick plates 9 which are set on edge and in turn are supported on the upper surface of the platen 2. There are a number of these plates as it is to be remembered that in an ordinary press of this kind there is about one hundred and fifty ton pressure exerted on the molding of the buttons.

Near each corner of the press there is what I term the knock-out posts 10, two of which may be seen in Fig. 1, and it will be understood that the other two will be at the other end of the press.

Describing one of these rods, and a description of one is a description of all, and still referring to the left side of Fig. 1, one of these knock-out posts 10 may be seen which projects as at 11 through the upper wing 12 of the platen 3. The post extends vertically and has its lower end 13 protruding slightly (₃⁄₁₆ of an inch) below the wing 14 of the lower platen 2.

Located on the base 1 may be seen the set screw 15 which is locked in place by the nut 16. This set screw is directly under the knock-out post 10 and when the platen 2 is allowed to lower by the piston 4, the set screw 15 will contact with the lower end 13 of the knock-out post 10, just three-sixteenths of an inch before the end of the lowermost position of the lower platen 2. This, in turn, will raise the knock-out post three-sixteenths of an inch which will project the ejector sleeve and molding pin, shortly to be described, three-sixteenths of an inch into the die cavity of the lower die.

Also mounted on the wing 14 of the lower platen may be seen the small housing 17 which is held in place by oppositely located bolts 18. These bolts 18, as may be seen in Fig. 7, pass through slots 19 in the base 20 of the housing 17 so that for quick removal of the housing when it is desired to dis-assemble the knock-out mechanism or to install it, the boltheads 18 may be given a turn or two and the base 20 pulled from beneath the bolts.

In the top of the housing 17 may be seen the stop or set screw 21 which is held in place by the lock nut 22 and it is this set screw or stop 21 that holds or supports the knock-out post at all times except when the lower platen 2 is in its lowermost position and the dies necessarily open.

Glancing upwardly from the housing 17 there will be seen the casing 23 through which passes the knock-out post 10 and to which post is adjustably secured the said casing 23 by the set screws 24. This casing is provided with the cylinder 25 in which is the piston 26 from which leads the piston rod 27, while leading to the lower end of the cylinder 25 may be seen the fragmentary portion of the flexible pipe 28 for supplying hydraulic pressure to the cylinder 25.

Somewhere along the pipe 28, there is a valve and timing mechanism 25' which I have diagrammatically illustrated. The purpose of this timing mechanism and valve is to admit pressure to the cylinder 25 to operate the piston 26 to in turn operate the molding pins after the press has been closed for a certain length of time. This timing mechanism will also permit the pressure to be relieved on the opening of the press as will be shortly described.

It will be understood that this timing mechanism might be situated at any desirable place just so it will operate its valve in the pipe 28.

On one side of the casing, directly over the set screw 21, is the lug 29 that contacts with the set screw 21 to thus support the housing and the knock-out post at all times except when the lower platen is reaching the lower end of its stroke. This lug may also be seen in detail in Fig. 7.

Also, there may be seen in Fig. 1, mounted on the adjustable piston rod 27, the yoke or collar 30, held in position by the set screw 31 while through the opposite end of the yoke passes the knock-out post 10. Mounted on the yoke and surrounding the knock-out post may be seen the coil spring 30'.

As heretofore mentioned, the other three knock-out posts and their associated mechanism are identical.

Just above the spring 30' may be seen the end of the header bar 32 and it will be understood that this extends along the one side of the press while each end is fastened by set screws 33 to a knock-out post 10. (See Figs. 2, 3, and 4.)

There is a similar header bar 34 on the right-hand side of the press, Fig. 1, that is likewise secured to the knock-out posts. In other words, there is a header bar on each side of the machine and they in turn are fastened near their opposite ends to the knock-out posts 10 that pass up through these bars.

Located on these header bars may be seen the spacing collars 35, while extending transversely of the machine and resting on these aforementioned collars may be seen the ejector sleeve bar 36 and holding bar 37.

As may be seen from Fig. 6, there is a multiplicity of these transversely extending sleeve ejector bars 36 under the lower die plate and they are so arranged that the respective ejector sleeves will pass up centrally of the die cavities to eject the buttons from the lower die cavities after the molding has been completed.

Still glancing at Fig. 1, there may also be seen the two inner header bars 38 that are positioned adjacent and extend parallel with the aforementioned header bars 32 and 34, these two header bars being fastened near their respective ends to the aforementioned piston rods 27. Also extending transversely of the machine and resting on these last mentioned header bars 38 are the molding pin bars 39, while secured thereto are the holding bars 40.

Thus it may be seen that there are a number of knock-out bars and molding pin bars that extend across the press at spaced intervals. These knock-out or ejector bars rest on the headers that extend along the sides of the press and which headers in turn, it will be remembered, are respectively fastened near their ends to the knock-out posts 10. The molding pin bars are connected to the piston rods 27, which latter, it will be remembered, are indirectly secured to the knock-out posts 10.

It goes without saying that the ejector sleeves and molding pins when operated will pass centrally through the lower die cavities.

Between the bars stand the heretofore mentioned plates 9 that rest on the lower platen 2 and in turn suport the lower die cavity mold.

As will be explained more in detail, the purpose of these headers, molding pin bars and ejector bars is that after the mold has been closed, the molding-pin bars may be elevated to project the molding pins up into the plastic charges when they are still in their plastic state; and then operate the ejector bars on the complete opening of the dies, so that the ejector sleeves surrounding the molding pins will be forced up into the lower die cavities to eject the now cured buttons from their respective dies.

Referring now to Fig. 4, there is shown on an enlarged scale a fragmentary portion of the headers 32 and 38 and knock-out bars 36 and 39 and also an ejector sleeve and its mechanisms together with the molding pin and its associated parts.

It will be understood that these molding pins and ejector sleeves are in registry with the respective lower die cavities and when the ejector sleeve mechanism is operated, all of the ejector sleeves will be operated, and in a like manner when one molding pin is operated all of the molding pins will be operated.

Inasmuch as each molding pin and its associated parts is alike and each ejector sleeve is alike, the one molding pin and its associated parts and the one ejector sleeve and its associated parts will be described.

Supported on the bar 39 will be seen a relatively short post 41 with its head 42, the head bearing on plate 39 and enclosed within the counterbore 43 in the holding bar 40, while the shank 41 passes through the opening 44 in the bar 40.

This post 41 also extends through an opening 45 in the ejector bar 36 and also is fitted within a socket 46 which will be described shortly.

The upper end of the post 41 is reduced as at 47 and threaded as at 48. Mounted on the end 47 of the post 41 may be seen the molding pin 49 which is provided with a collar 50 that rests on the end of the post, while over this collar 50 is the perforated threaded cap 51 to tightly hold the pin in its vertical mounted position.

Thus, an upward or downward movement of the header 38 will in turn move the post 41 and its molding pin 49, just described.

Referring now to the hollow socket 46 heretofore mentioned and in which slides the post 41, it will be seen that this socket is also provided with a head 52 which rests on the aforementioned ejector bar 36, which plate in turn, it will be remembered, extends across the machine and is supported on the collars 35. The upper end of the socket is provided with a threaded projection 53 with a central depression 54 while mounted in this depression on the end of the projection is the ejector sleeve 55.

This sleeve 55 has the collar 56 thereon and to hold the sleeve in position is the internally threaded perforated cap 57 fitting over the collar.

The threaded projection at the end of the socket 53 has a central bore 58, and likewise the ejector sleeve 55 has the central bore 59 so that the aforementioned molding pin 49 may pass up through the projection at the end of the socket and through the ejector sleeve as may be seen in Fig. 4.

The upper end of the socket 46, of course, passes through the hole 60 in the lower steam plate 8 and the sleeve 55 passes through one of the bottom dies in the lower die plate 7.

It goes without saying that the ejector sleeve and the molding pin pass centrally through the lower die cavity, as it is the molding pin 49 that molds the bore in the button, in which bore (in the finished article) will be driven the prong of a tack fastener.

Thus, it will be seen that an upward movement of the header bar 38 will elevate the molding pin 49; the post 41 and the molding pin sliding freely within the socket 46 and the ejector sleeve 55.

Likewise, an upward movement of the header 32 and the ejector bar 36, when the dies are nearly completely open, will elevate the ejector sleeve within the die cavity.

As will be shortly described, the molding pin and ejector sleeve may move in unison or, of course, they may and must operate independently of each other.

Figure 5:
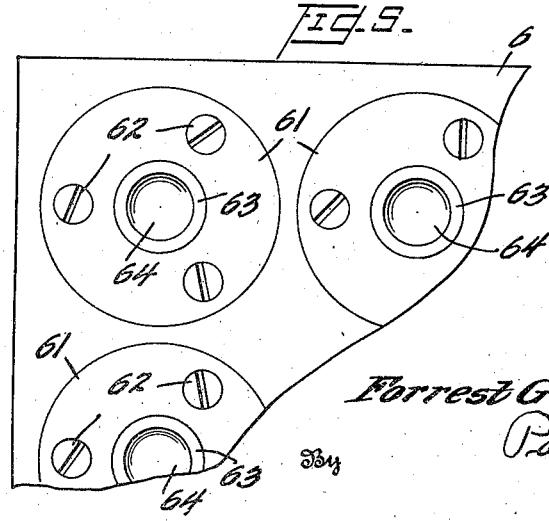
Fig. 5 is a fragmentary bottom plan view of the upper dies.

Referring now to Figs. 1 and 5, there may be seen in the upper die plate 6 the plurality of rings 61 which are fitted in the plate and held by the screws 62, and these rings hold the upper dies 63 which, of course, will have their respective upper die cavities 64 in registry with the lower die cavities 68 in the lower dies 65. These upper die cavities may be engraved so that the desired insignia and/or trade-mark or other indicia will be molded on the face of the button.

Also, by providing the rings for holding the upper dies, the dies may be readily removed and new ones substituted when it is desired to mold buttons with different insignia or trade-mark matter thereon.

In other words it is not necessary to remove the lower dies or any of the mechanism to change the upper dies, when a button with a different molded face is desired.

It might be mentioned that the lower dies 65 have slightly enlarged bases 66 which are fitted within the counter-bores 67 of the lower die plate, and these bases rest on the lower steam plate 8. The lower die cavities 68 are die-sunk to the shape desired to form the body of the button, and it will be seen it is also a simple matter to remove the lower die plate at any time and substitute other forms of lower dies if desired.

It will also be seen that the molding pin, ejector sleeve and the knock-out mechanism may be quickly removed if desired. Glancing at Fig. 1 there may be seen the bolt 69 that is fitted in the holding bar 40 which passes through the molding pin bar 39 and is secured in the header bar 38. Just above this bolt there is an aperture 70 that passes through the holding bar 37 and the ejector bar 36 so that a screw driver may be quickly inserted in the kerf of the bolt 69 to remove the same.

Also there is a bolt 71 in the holding bar 37 that passes through the ejector bar 36 and the collar 35 and is secured in the header 32.

This arrangement is carried out in all the headers and their associated parts so that with the loosening of these several bolts the knock-out mechanism and molding-pin bars may be quickly removed when desired.

Finally it will be seen that on each knock-out post 10 there is the buffer spring 72 and also the lower spring 30' that rests on the yoke 30 under the header 32.

Thus, if ever necessary to dis-assemble or remove these posts and headers, the bolts 18 for the housing 17 may be given one or two turns and the housing removed as it will be remembered that these bolts fit in the slots 19 in the base 20. Then the set screws 24 may be loosened in the housing 25 and likewise, the set screws 33 as well as the collar 73 and the yoke 30; after which the knock-out posts may then be pulled through the upper wings 12. Also, the piston rod 27 may be disconnected from the header 38.

It will be understood, however, that should it be desirable to remove a broken sleeve or a broken pin, it will not be necessary to remove the various headers, knock-out mechanisms, etc., but simply remove those bars in which the damaged parts are located.

In a reverse manner the parts can be reassembled quickly when desired.

In reassembling, of course, the header 38 and the molding-pin bar 39 and the molding pin and the holding bar would be first placed in position after which the knock-out sleeve mechanism would be assembled.

Method

Now before describing the step-by-step operation of the mechanism or the elevating and lowering of the molding pin and ejector sleeves, reference is made to the Figs. 9 to 16 to describe generally what takes place on the molding of the button, the formation of the bore in the button, and the ejecting of the button from the lower die cavity.

In Fig. 9 there is shown a fragmentary portion of the lower die 65 and the upper die 63 and also the upper end of the ejector sleeve 55 and the molding pin 49. The dies being in their fully opened position, the platen 2 will be in its lowermost position, the knock-out post 10 will be elevated, and also the ejector sleeve and the molding pin will be in their elevated position as is shown. There also may be seen a plastic pill P resting in the lower die cavity 68.

Although it is not illustrated, it might be mentioned that in multiple die cavity molding, there is generally provided a tray in which will be positioned the 250 or 300 plastic pills P, that is, one pill for each die cavity. The bottom of the tray has small openings therein in which are fitted the respective pills, and under this bottom there is another slidable bottom so that when the tray is accurately positioned over the lower holding plate, the slidable bottom of the tray is moved to thus drop one pill in each of the say 300 die cavities.

These trays can be filled by helpers so that when molding the buttons, a number of trays may be filled in advance, to thus feed the pills to the press as soon as the previously molded buttons are removed.

Here it might also be mentioned that in removing the buttons there is generally provided a tray with small openings and keyhole slots so that the tray can be lowered over the molded buttons after they have been ejected from the die cavities and rest on the ejector sleeve (as will be later mentioned). Then the trays are moved laterally a short distance so that the hubs of the respective buttons will pass into the respective keyhole slots. Then the tray is removed in this way to collect the 300 buttons at one time. If these buttons have certain insignia thereon they can in this way be collected and kept separate from similar buttons with different insignia thereon.

Getting back to Fig. 9 (and for simplicity of explanation, the operation on one pill will be described) after the pill P has been inserted and the lower platen elevated, the lower die will start to rise and as may be seen in Fig. 10, the ejector sleeve 55, and the molding pin 49 will automatically be retracted to the bottom of the die cavity 68 (as the knock-out post 10 will be automatically lowered).

The dies are then closed as shown in Fig. 11 and the plastic crushed, and under the heat and pressure the plastic will now flow to thus completely fill the upper and lower die cavities and take the shape of the final product (with the exception of the bore).

Any flash or excess material will pass out of the space 74 between the adjacent surfaces of the upper and lower dies.

We now have the pill in its plastic form, and it will be understood that inasmuch as the relatively thin molding pin 49 has not up to this time extended within the lower die cavity, there is absolutely no possibility of it being injured or bent or broken as the plastic flows about and through and across the upper and lower die cavities.

Generally, in molding operations of this kind, the molding pin extends up within the lower die cavity during the first melting and crushing of the pill and, as heretofore mentioned, if the plastic pill in its solid state crushes and fills up, say one side of the die cavity before the other due to the pressure, it will flow across the die cavity and thus bend the molding pin, and for this reason it was necessary, heretofore, to have the molding pin extend only into the lower die cavity a distance equal to its diameter.

Referring now to Fig. 12, the molding pin 49 has now been elevated and projects up into the lower die cavity and nearly to the top of the plastic button.

It presents no difficulties to elevate the pin at this phase because the plastic pill is now in its plastic state and there is no movement of the plastic within the die cavity.

Any excess plastic that is moved by the molding pin will be forced out of the space 74, but it is to be remembered that the molding pin is a relatively thin one and there will be but little plastic forced out, if any, when the bore is formed.

The plastic is allowed to cure for the desired period and then the dies are opened as shown in Fig. 13 and during the opening movement, the molding pin is again retracted (by lowering the piston rod 27), the button now being fully cured. Then, as may be seen in Fig. 14, when the dies reach their fully opened position, the ejector sleeve 55, together with the molding pin 49, are automatically elevated to the position shown in Fig. 14.

The tray heretofore mentioned will then be placed over the buttons and moved laterally so that the ejected buttons may be gathered in the tray and then placed in a tumbling barrel for cleaning and polishing.

It will be understood in Figs. 9 to 14 that I have shown successive steps, but, of course, the distances between the dies when they are open is much greater than that shown so that the tray can be inserted over the buttons both to remove them and in a like manner to deposit the pills in their respective die cavities.

In Fig. 15 there is shown in cross section the molded button B with its deep hole or bore to receive the prong of a fastener (not shown) and in Fig. 16, a bottom plan view of the button is shown.

Thus, it will be seen in carrying out this method of deep hole molding, the molding pin is not projected or does not extend into the lower die cavity at the time it would naturally be damaged, that is, when the plastic is flowing across the die cavity.

Another advantage is that when the buttons are removed by the tray method, the molding pin has been withdrawn from the button and is protected by the ejector sleeve. The buttons may not only be removed by the tray method, but they may be swept by hand from the ejector sleeves or blown from their position by compressed air without fear of damage to the molding pins.

As heretofore mentioned, the plastic buttons are relatively small and the bore or hole is relatively small in diameter, but it is desirable to have a deep hole therein. Thus the present method permits of the deep hole molding, but overcomes the difficulties heretofore presented.

Having thus described broadly the method and having previously described the knock-out and molding pin operations, the sequence of operations of the knock-out mechanisms will now be briefly described.

*Operation*

Assume that the platen 2 is in its lowermost position as shown in Fig. 1, and that the plastic pills have been placed in their respective lower die cavities. It will be noticed that the knock-out posts 10 are now in a raised position with respect to the lower platen as the lower ends 13 of the knock-out post 10 have been forced upwardly on contact with the stops 15 on the base 1 when the platen was lowered.

Inasmuch as the knock-out posts 10 are in their elevated position, the headers 32 and 34 and the ejector sleeve bar 36 will be in their elevated position and likewise the housings 23 which carry the pistons 26 will be elevated and the headers 38 which operate the molding pin 49 will be in their elevated position.

In other words, the ejector sleeves and the molding pins will be protruding up through the lower die cavities as shown in Fig. 1 and Fig. 9, and in this instance the ejector sleeves and the molding pins operate in unison.

Hydraulic pressure is then admitted to a cylinder (not shown) in the base 1 to operate the hydraulic plunger piston 4 to elevate the lower platen 2.

As the platen 2 is slightly elevated, the knock-out posts 10, under the action of the springs 72 and due to the weight of the housing 23 etc., will move downwardly guided by the two wings 12 and 14 until such time as the lugs 29 contact with the stops 21 in the housings 17.

The lowering of the knock-out posts on the rising of the platen permits the four headers 32, 34 and 38 to also slightly lower, which in turn, permits the molding pins 49 and the ejector sleeves 55 to assume the position shown in Figs. 2, 10 and 11.

Also, the knock-out posts 10 and the headers will be in the position shown in Fig. 2 at the closing of the dies.

Thus, on the first three-sixteenths of an inch of upward travel of the lower platen 2, the knock-out posts 10 and their associated parts are allowed to lower so that the molding pins and ejector sleeves are no longer projecting up into the die cavities. After the platen has reached its uppermost limit of travel, and the dies are closed, as also shown in Fig. 2, the plastic pills will be crushed and melted and flow to fill up their respective upper and lower die cavities. This is also clearly shown in Fig. 2.

After an appreciable time, but before the plastic is cured, pressure is admitted by valves 25' through the flexible conduits 28 to operate the pistons 26 and the piston rods 27, which latter are connected to their headers 38, to in turn operate the molding-pin operating bars 39 and likewise, the posts 41, to force the molding pins 49 upward into the now soft plastic which has ceased to flow across the respective die cavities and entirely fills the upper and lower die cavities.

After the dies have been closed for the amount of time it takes to cure the buttons, the valves (not shown) for operating the hydraulically operated piston 4 are opened to allow the lower platen to descend.

However, while the platen 2 is descending, the pressure in the flexible conduits 28 will be also cut off by the time-operated valve 25' and allowed to discharge so that as the platen 2 is descending, the pistons 25 and the piston rods 27 will be lowered to their original position.

The springs 30', pressing on the yokes, plus the weight of the parts, also assist in returning the pistons 25 and piston rods 27 to their original position. Of course, as the piston rods 27 lower, they permit the headers 38 to lower and likewise the operating bars 39, to thus retract the molding pins from the lower die cavities 68.

In other words, when the dies are first closed, the molding pin will be in the position as shown in Figs. 2 and 11. Then, when the piston rods 27 are activated, the molding pins will be in the position shown in Figs. 3 and 12, and as the platen again descends and the dies are open and pressure is relieved from the piston 25, the molding pin will again be in the position as shown in Figs. 2 and 13.

Just before the lower platen 2 reaches its lowermost point of travel, the stops 15 will again contact with the knock-out posts 10 elevating them slightly and as they are elevated then through the mediums of the headers, knock-out bars, and the posts 41 and the sockets 46, the ejector sleeves and the molding pins will again project up into the die cavities, strip the buttons from the cavities and the molded buttons will rest on the ejector sleeves as illustrated in Fig. 14.

Thus it will be seen that the ejector sleeve and the molding pin operate together when the platen approaches its lowermost end of travel, and likewise the molding pin and the ejector sleeve work in unison when the lower platen first starts to elevate. However, when the dies are closed, the molding pins are operated independently of the ejector sleeve.

After the molding of the buttons and they are in the position as shown in Fig. 14, as heretofore mentioned, they may be removed in a tray or brushed off or blown from their position, after which a new load of plastic can be supplied to the multiple die cavities and the operation repeated.

It is to be mentioned that in part of the above description reference is generally made to a knock-out post and an ejector sleeve and a molding pin, but it is, of course, understood that in each cross bar there are a number of molding pins and sleeves and posts so that on the one operation several hundred buttons are molded with a deep bore at the one time.

It is to be remembered that there are four knock-out posts and there are four pistons, and that the headers extend along the side of the press. Also these various knock-out bars with their molding pin and ejector sleeve mechanism extend transversely of the press and rest on these aforementioned headers.

Also, as has been heretofore mentioned, it is a simple matter to apply this knock-out mechanism to a type of press now in service that generally has but a single knock-out mechanism for the ejector sleeves.

Finally, the parts are so arranged that it is a simple matter to assemble or dis-assemble the parts and I am able to mold deep hole buttons or the like wherein the depth of the hole can be five times as great as the diameter of the molding pin, and it might be mentioned en passant that in the molding of thousands of buttons, there have never been any of the pins damaged.

From the foregoing, it will be seen that I have provided an extremely simple method for deep hole molding which is primarily due to the fact that while the plastic is first subjected to the heavy pressure and heat and is flowing across the cavities, the molding pin is not in its molding position but down in the ejector sleeve. Then after this cross flow is stopped and the plastic in its soft state, the molding pin is projected into the die cavity to thus mold the relatively deep hole.

It is to be understood when describing the molding of the button and ejector sleeve and molding pin, that the singular shall include the plural and vice versa where the context permits.

The knock-out and pin-injector mechanisms described are easily assembled and permit of molding a great quantity of buttons or the like at one time without any fear of damage to the relatively thin molding pins.

Should it be necessary, however, to change a molding pin or an ejector sleeve, it is a simple matter to unfasten and remove a bar and substitute or replace the broken part.

Whenever it is desired to mold buttons with different insignia thereon it is a simple matter to loosen the rings, remove the upper dies, and substitute new ones, without in any way interfering with the knock-out mechanism or other parts of the press.

It also is to be finally noted that from a mechanical standpoint there is an advantage in having the ejector sleeves and their molding pins extend into the lower die cavity rather than operate from the upper die cavity, as any oil that is placed on the molding pins, so that they will slide freely in the bores of the molding sleeves, will tend to seep or run down to keep them well oiled. At the same time there is no possibility of any excess oil running into the die cavity which might be the case if the ejector sleeves and molding pins were mounted in the upper die cavities.

Also any dirt or specks or molding flash cannot settle on the face die and become embedded in the face of the button. Should any such matter settle on the cavity which molds the back of the button it will become embedded in it and will not affect the appearance of the button.

Many slight changes might be made without departing from the spirit and scope of the invention.

Having thus described my invention what I claim is new and desire to secure by Letters Patent is:

1. In combination with a press for molding plastics having separable dies provided with die cavities; an ejector associated with a die cavity, automatic means for moving the said ejector into said die cavity just before the dies are in a fully opened position, a relatively thin, long molding pin slideably fitted within the ejector and automatically controlled means for projecting the molding pin into said die cavity only after the dies are in their closed position.

2. In combination with a press for molding plastics having separable dies provided with die cavities, an ejector associated with a die cavity, a relatively long, thin molding pin, slideably fitted within said ejector, means associated with the molding pin for projecting the same into said die cavity after the dies have been closed, means for assisting in the retraction of the molding pin as the dies are opening, and automatic means for projecting the molding pin and the ejector into the die cavity just before the dies are in their fully opened position.

3. In combination with a press for molding plastics having a plurality of separable dies provided with die cavities, a plurality of ejectors associated with their respective die cavities, a plurality of relatively long, thin molding pins also slideably fitted within the respective ejectors, means associated with the molding pins for simultaneously projecting the same into their respective die cavities after the dies have been closed, the said molding pins also being capable of being simultaneously retracted as the dies are opening, and automatic means for simultaneously projecting all of the molding pins and ejectors into their respective die cavities just before the dies reach their fully opened position.

4. In combination with a press for molding plastics having a plurality of upper and lower dies, a plurality of ejectors associated with the respective lower dies, a plurality of relatively long, thin molding pins slideably fitted within the respective ejectors, means associated with the molding pins for simultaneously projecting the same into their respective dies only after the upper and lower dies have mated, the said molding pins being capable of being simultaneously retracted before the upper and lower dies are fully separated, and means for simultaneously projecting all of the molding pins and all of the ejectors into their respective die cavities on a complete separation of the upper and lower dies.

5. In combination with a press for molding plastics having a plurality of upper and lower dies, a plurality of ejectors associated with their respective lower dies, a plurality of relatively thin molding pins slideably fitted within the respective ejectors, knock-out posts associated with the ejectors and molding-pins, time controlled means associated with the molding pins for simultaneously projecting the molding pins into their respective die cavities only after the upper and lower dies have mated, the said molding pins also being capable of being simultaneously retracted during a lowering of the dies, and means for raising the knock-out posts as the dies are approaching their fully opened position to thus project all of the molding pins and all of the ejectors into their respective die cavities.

6. In combination with a press for molding plastics having a plurality of upper and lower dies; headers located on the opposite sides of the press, knock-out bars supported by said headers, ejectors supported by said knock-out bars and movable into the lower dies, knock-out posts, the said headers secured near their opposite ends to said knock-out posts, means for elevating the knock-out posts with relation to the lower dies to actuate the ejectors; additional headers also located on the opposite sides of the press, molding-pin bars supported on said last mentioned headers, molding pins associated with the molding-pin bars slideable in said ejectors and said pins also adapted to be projected within the dies, and means also carried by the knock-out posts for operating said molding-pin bars to project said molding pins into the die cavities when the knock-out posts are in lowered position with respect to the lower dies.

7. In combination with a press for molding plastics, having a plurality of upper and lower dies; headers located on the opposite sides of the press, knock-out bars supported on said headers, ejector mechanisms supported by said knock-out bars, and movable into and out of the lower dies, knock-out posts, the said headers secured near their opposite ends to said knock-out posts, means for elevating the knock-out posts with relation to the lower dies to actuate the headers, crossbars and ejector mechanisms; additional headers also located on the opposite sides of the press, molding-pin bars and molding-pin mechanisms supported on said last mentioned headers, the said molding pins slideable in said ejector mechanisms also adapted to be projected within said dies, and means carried by the said knock-out posts to project said molding pins into the said die cavities after the dies are closed, the molding pins and ejectors also operated in unison by an elevation of said knock-out posts as the headers and dies approach their fully opened position.

8. A method of deep hole molding a solid article which consists in first subjecting a charge of fusible plastic material to heat and pressure in separable molding dies at least one of which has a cavity therein to reduce the charge to its fluid state, then slideably projecting a molding-pin of relatively small diameter into the material while in the fluid state, not wholly therethrough, but for a distance greater than the diameter of the pin, to thus form the bore and densify the plastic material, then curing the plastic material while the molding-pin remains in its projected position, then parting the dies and retracting the molding-pin whereby the article remains in the cavity in one of said separable dies, then projecting a support for the molded article separate from said pin into the die containing said article to partially raise the molded article from the die cavity and at the same time support the same, and finally removing the finished article from its support.

9. A method of deep hole molding a solid article which consists in first subjecting a charge of fusible plastic material to heat and pressure in separable molding dies at least one of which has a cavity therein to reduce the charge to its fluid state, then slideably projecting a molding-pin of relatively small diameter into the material while in the fluid state, not wholly therethrough, but for a distance substantially twice as great as the diameter of the pin, to thus form the bore and densify the plastic material, then curing the plastic material while the molding-pin remains in its projected position, then parting the dies and retracting the molding-pin whereby the article remains in the cavity in one of said separable dies, then projecting a support for the molded article separate from said pin into the die containing said article to partially raise the molded article from the die cavity and at the same time support the same, and finally removing the finished article from its support.

10. A method of deep hole molding a solid article which consists in first subjecting a charge of fusible plastic material to heat and pressure in separable molding dies at least one of which has a cavity therein to reduce the charge to its fluid state, then slideably projecting a molding-pin of relatively small diameter into the material while in the fluid state, not wholly therethrough, but for a distance substantially four times as great as the diameter of the pin, to thus form the bore and densify the plastic material, then curing the plastic material while the molding-pin remains in its projected position, then parting the dies and retracting the molding-pin whereby the article remains in the cavity in one of said separable dies, then projecting a support for the molded article separate from said pin into the die containing said article to partially raise the molded article from the die cavity and at the same time support the same, and finally removing the finished article from its support.

11. In combination with a press for molding plastics having separable dies provided with die cavities; an ejector associated with a die cavity, automatic means for moving the said ejector into said die cavity, a relatively thin, long molding pin slideably fitted within the ejector and automatically controlled means for projecting the molding pin into said die cavity only after the dies are in their closed position.

FORREST G. PURINTON.